UNITED STATES PATENT OFFICE.

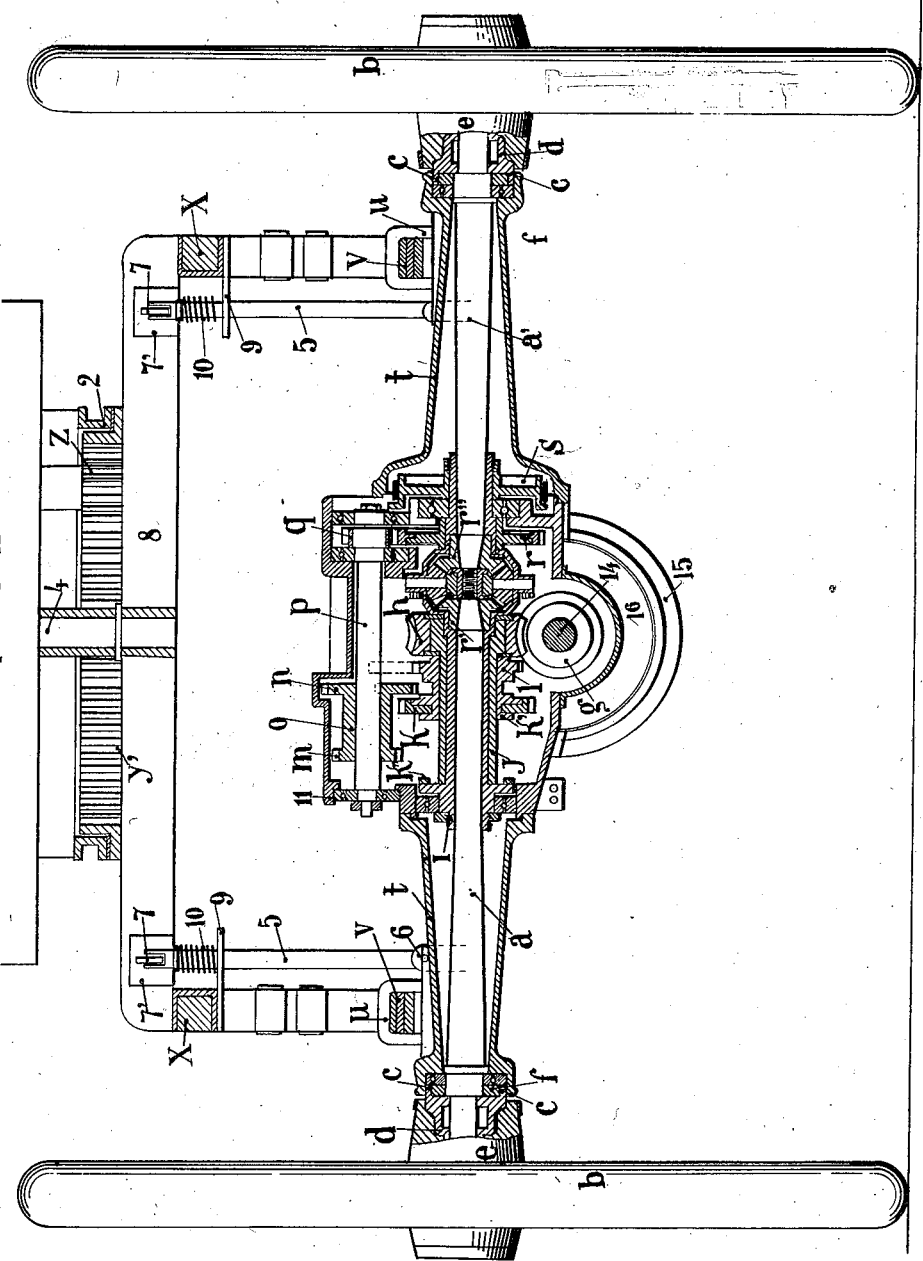

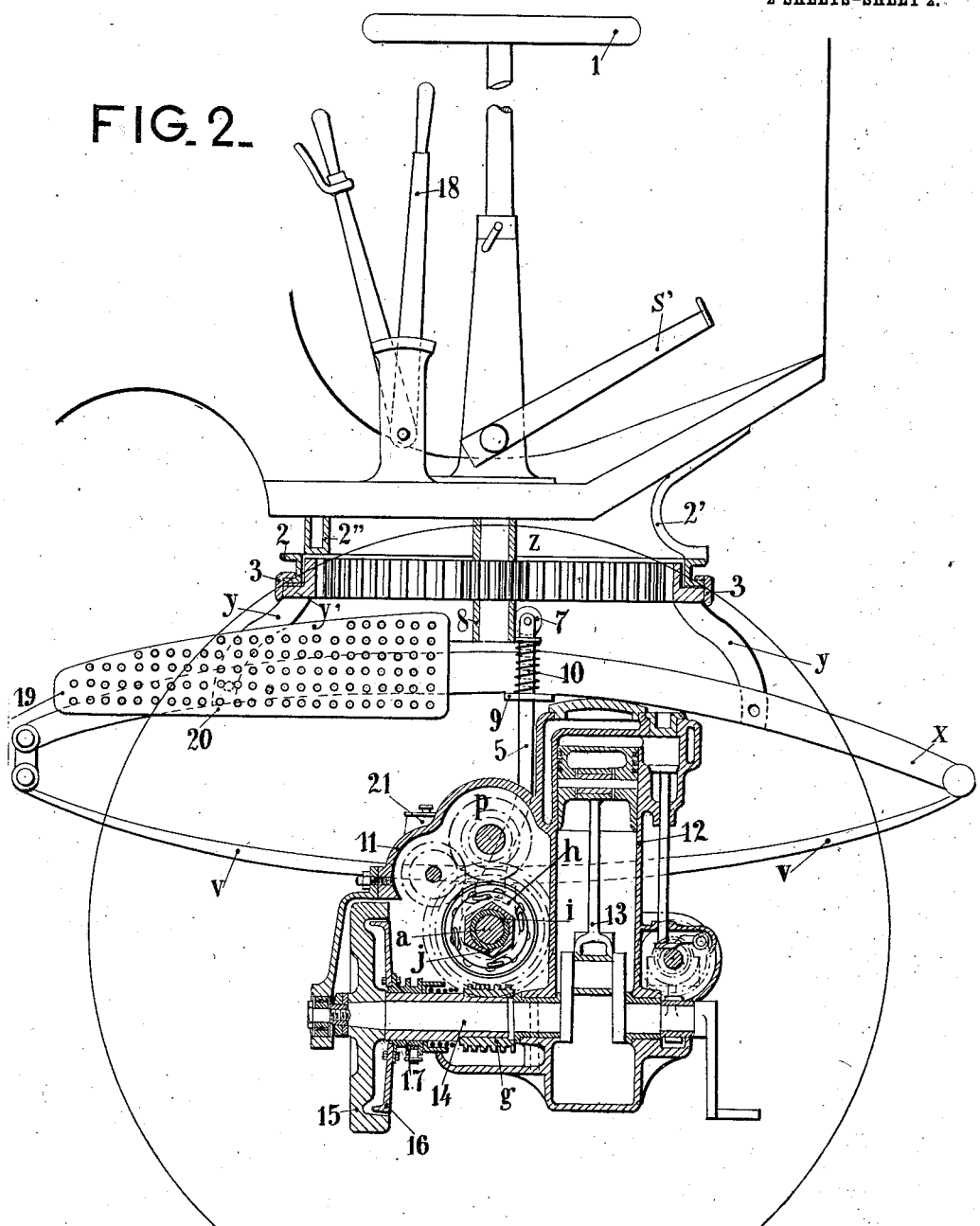

GUSTAVE EMILE NOÉ ISIDORE ERNEST SUBRA, OF FONTENAY-SOUS-BOIS, FRANCE.

AUTO FORE-CARRIAGE FOR VEHICLES.

1,031,825.  Specification of Letters Patent.  Patented July 9, 1912.

Application filed October 12, 1910. Serial No. 586,617.

*To all whom it may concern:*

Be it known that I, GUSTAVE EMILE NOÉ ISIDORE ERNEST SUBRA, engineer, citizen of the French Republic, residing at Fontenay-sous-Bois, in the Department of the Seine and Republic of France, have invented certain new and useful Improvements in Auto Fore-Carriages for Vehicles, of which the following is a specification.

The present invention relates to an auto-fore-carriage device applicable to passenger or commercial vehicles designed to replace animal traction by mechanical power for the transport of passengers or merchandise without requiring alterations to the body of the vehicle. For the purpose of steering the fore-carriage turns in the same way as an ordinary fore-carriage around a central pin, and it actuates by means of a driving axle the two steering wheels with which said axle is fitted at the ends.

According to the present invention, the engine and transmission gear are mounted directly upon the live axle casing or bridge, the parts being arranged astride said bridge so that their weight is balanced thereon; the axle is controlled by a pair of compensating rods which are pivoted thereto at their lower ends on axes lying longitudinally of the vehicle in such a manner as to allow uneven tilting of the axle, while their upper ends are guided against the fore-carriage frame to resist the driving torque or reaction of the axle. These rods are provided with auxiliary springs or shock-absorbers fitted between collars mounted on the rods and guides attached to the fore-carriage; these springs act in opposition to the main springs and render more smooth the riding of the vehicle in the known manner. The transmission of power is effected by means of a worm drive, which presents the special advantage of affording at a single step the large reduction of gear necessary to obtain with a high speed engine the comparatively low speed of travel essential in converted vehicles of the type in question. This worm drive constitutes the direct drive or top speed gearing, while the lower speeds and reverse are obtained by means of a change speed gear of the known type. As a result of the large gear reduction embodied in the worm drive, this gearing may be irreversible; consequently the worm wheel is provided with a "free wheel" or ratchet clutch device which enables the vehicle to travel without the engine revolving, as for instance in descending hills.

The auto fore-carriage arrangement which forms the object of the present invention is shown by way of example on the annexed drawings, in which:

Figure 1 is a sectional elevation of the device. Fig. 2 is a section at right angles thereto.

Upon a divided axle $a$ $a'$ are mounted at the respective extremities the two driving and steering wheels $b$, operated by means of the claws or jaw clutches $c$ secured to the hub $e$ of each of the wheels by the bush or center $d$. The claws $c$ engage suitable notched seatings formed upon a disk $f$ secured to the axle and rotated therewith.

The rotation of the engine shaft 14 is transmitted to the fore-carriage by means of a worm $g$ actuated by the engine shaft and constantly in mesh with a worm-wheel $h$ mounted with a free-wheel movement upon a sleeve $j$ surrounding the differential sleeve $i$. By the aid of this free wheel movement the carriage is able to descend an incline at a greater speed than that which would be imparted to it by the engine. The sleeve $j$ is of hexagonal section and upon it are mounted the pinions $k$ and $l$; the pinion $l$ operates the first speed and the reverse, the pinion $k$ controls the second speed, when brought into mesh respectively with the toothed wheels $m$ $n$ rigidly secured to the sleeve $o$ secured on a countershaft $p$. The third speed is obtained by engaging the clutch-part $k'$ of the pinion $k$ in the corresponding notches of the jaw-clutch $k''$. Rotary motion is transmitted between the shaft $p$ and the axle $a$ $a'$ by means of a toothed wheel $q$ supported on the shaft $p$ and in mesh with another wheel $r$ on the differential. The two parts $a$ $a'$ of the divided axle are connected in the usual manner through the medium of the bevel wheels $r'$ placed, for this purpose, at the inner end of the axles. The brake on the differential is formed by a pulley or drum $s$ around which is arranged a band which can be operated from outside through a flexible control by the pedal $s$. The rotation imparted to each of the parts $a$ $a'$ which form the driving shaft, is transmitted to the wheels through the disks $f$ the notched peripheries of which receive the corresponding claws $c$ of the centers $d$. Each of these disks rotates the wheel to which it is secured. The parts $i$ $a'$ of the shaft turn in a casing $t$ on which are fixed the stirrups $u$ designed to receive the springs $v$, fixed at their other ends to the underframe $x$ to which is secured by means of support $y$ a ring $y'$ the toothed interior of which, meshing with a pinion $z$ controlled by the wheel 1 constitutes the steering gear. On the outside of the toothed ring $y'$ is placed a second channel-shaped ring 2 made integral with the body of the vehicle by the support 2' and the girder 2" and held against the toothed ring by means of clips 3 arranged for this purpose in front and behind. The rings $y$ and 2 turn around the pin 4 in the usual way.

Rods 5 pivoted between ears 6 attached to the casing $t$, and carrying at their upper ends rollers 7 moving on elastic supports 7' integral with the cross members 8, are intended to compensate the lateral forces at the time of starting and stopping: for this purpose, the rods 5 are held in a metal piece 9 fixed to the underframe $x$. The vertical forces are compensated by the spring 10 conveniently placed at the top of the rod 5. This spring 10 in compressing the ordinary springs of the vehicle forms in some ways a shock absorber.

The moving parts of the auto fore-carriage are contained in a gear case 11 and operated by an engine of one or more cylinders, vertical, horizontal or inclined, which works by means of the piston 13, the crank shaft 14 on which are mounted the worm $g$ in mesh with the free-wheel gear $h$, as well as the fly-wheel 15, the clutch 16 and the collar 17 for operating the clutch. The changes of speed are effected by means of the lever 18 which operates through a flexible transmission, a sliding gear member which, in the example shown on the annexed drawings, can impart to the vehicle three different speeds.

Between the two underframes $x$ and behind the cross piece 8 are placed the petrol tank and the two water reservoirs 19 joined together by small horizontal tubes 20 forming the radiator.

An oil reservoir 21 is situated in any convenient part of the gear case 11 and integral therewith.

Having thus described my invention, what I claim as such and desire to secure by Letters Patent is:—

1. An auto fore-carriage for vehicles, comprising a casing, an axle mounted in said casing, wheels journaled at the outer ends of said axle, an engine, a frame supported above the axle, springs between said frame and axle, transmission gear connecting the engine to said axle, said engine and transmission gear being mounted astride, said casing, and rods pivoted to said casing, said rods being guided at their upper ends against the said frame.

2. An auto fore-carriage for vehicles, comprising a casing, an axle mounted in said casing, wheels journaled at the outer ends of said axle, an engine, transmission gear connecting said engine to said axle, said engine and transmission gear being mounted astride said casing, said transmission gear including a worm directly rotated by the engine, a worm-wheel engaging said worm and a free-wheel device connecting said worm-wheel to said axle, a fore-carriage frame supported above the axle, springs between said frame and axle, and means for resisting the torque of said casing.

3. An auto-fore-carriage for vehicles, comprising a casing, an axle mounted in said casing, wheels journaled at the outer ends of said axle, an engine, a fore-carriage frame, springs between the same and axle, a fly wheel, said engine and flywheel mounted rigidly upon said casing on opposite sides thereof, transmission gear connecting said engine to said axle, said transmission gear being mounted directly upon said casing, rods pivoted to said casing at their lower ends on axes lying lengthwise of the vehicle, said rods guided at their upper ends against the fore-carriage frame, collars upon said rods, and coiled springs inserted between said collars and said frame.

4. An auto fore-carriage for vehicles, comprising a casing, an axle mounted therein, wheels journaled at the outer ends of said axle, an engine, a fore-carriage frame above the axle, springs between said frame and axle, transmission gear connecting the engine to the axle, and pivoted rods between the casing and fore-carriage frame having their upper ends guided against the latter, said rods adapted to resist the driving torque or reaction of the axle.

5. An auto fore-carriage for vehicles, comprising a casing, an axle mounted therein, wheels journaled at the outer ends of said axle, an engine, a fore-carriage frame above the axle, springs between said frame and axle, transmission gear, connecting the engine to the axle, pivoted rods between the casing and fore-carriage frame having their upper ends guided against the latter, said rods adapted to resist the driving torque or reaction of the axle, and shock absorbing elements on said rods between the fore-carriage frame and said springs.

In testimony whereof I affix my signature in presence of two witnesses.

GUSTAVE EMILE NOÉ
ISIDORE ERNEST SUBRA.

Witnesses:
DOUMÉ CASALONGA,
GUSTAVE DUMONT.